2,771,400

CATALYTIC DESULPHURISATION OF MOTOR FUELS CONTAINING BENZOLE

Frederick William Bertram Porter and John Welford Hyde, Sunbury-on-Thames, England, assignors to The British Petroleum Company Limited No Drawing. Application May 27, 1953,
Serial No. 357,882

Claims priority, application Great Britain June 5, 1952

2 Claims. (Cl. 196—28)

This invention relates to the catalytic desulphurisation of benzole and of motor fuels containing benzole. Motor benzole usually consists of a mixture of benzole and a petroleum blending component consisting of straight-run spirit or a mixture of straight-run and thermally cracked spirit. Typical motor benzoles consist of 15–35% by volume of benzole and 85–65% by volume of straight-run motor spirit or mixtures of straight-run and thermally cracked spirits. The sulphur contents of typical benzoles obtained from the destructive distillation of carboniferous deposits, such as coals and lignites, are usually in the range 0.4–0.7% by weight and they consist largely of aromatic compounds with small quantities of unsaturated compounds, substituted hydrocarbons, and traces of carbon disulphides, all of which tend to promote instability in motor spirit blends, especially when leaded.

The autofining process for the catalytic desulphurisation of various petroleum feedstocks has been described in the specification of a number of United States patents among which may be mentioned Nos. 2,573,726, 2,574,446, 2,574,445, 2,606,141, 2,574,447 and 2,574,448.

According to the invention therefore, a process for the catalytic desulphurisation of benzole or of motor fuel consisting of a mixture of benzole and straight-run petroleum benzine, comprises passing the benzole or the fuel in vapour form in admixture with hydrogen over a sulphur-resistant dehydrogenation-hydrogenation catalyst which combines activity for the dehydrogenation of naphthenes to aromatics with activity for the conversion of organically combined sulphur into hydrogen sulphide, at a temperature and pressure such that the dehydrogenation of naphthenes contained in the benzole or fuel is effected to an extent not substantially in excess of that required to produce sufficient hydrogen to convert the organically combined sulphur in the benzole or fuel into hydrogen sulphide and to maintain the vapour phase in the reaction zone, a hydrogen-rich gas being separated from the treated benzole or fuel and recycled to the reaction zone to constitute the whole of the hydrogen supplied to said zone.

In general, the process may be carried out under the temperature and pressure conditions and using a catalyst of the kind described in the specification of United States Patent No. 2,573,726 and may advantageously be carried out under the following set of conditions.

Space velocity _____ 0.5–3.0 v./v./hr.
Temperature _____ 750–800° F.
Pressure _____ 100 p. s. i. ga. to equilibrium.
Recycle rate _____ 2000–10,000 S. C. F./B.
Catalyst _____ Cobalt and molybdenum oxides on alumina.

The reference to the pressure condition is to be understood to mean that the process is operated initially at a pressure of 100 p. s. i. ga. either by means of hydrogen obtained from previous autofining operations on the same or another feedstock, or by means of extraneous hydrogen, and the pressure is then allowed to reach an equilibrium pressure by recycling to the reaction zone all the hydrogen made in the process. Such a method of operation is described in the specification of the copending U. S. application No. 153,339/50, now U. S. Patent No. 2,648,623. When treating benzole alone, the pressure falls to an equilibrium value below 100 p. s. i. ga.

The invention will now be described with reference to the following examples.

EXAMPLE I

Two motor benzole blends were made up from a gasoline fraction derived from a Middle East crude petroleum and a benzole, the ratios of the blending components being 85:15 and 70:30 respectively. The properties of the blending components are set out in Table 1 and the properties of the blends in Table 2.

Table 1

|  | Gasoline Fraction ex Middle East Crude | Coal Tar Benzole |
|---|---|---|
| Specific Gravity @ 60° F./60° F | 0.72 | 0.88 |
| Distillation: | | |
| I. B. P _____ °C | 45 | 77 |
| 5% vol. @ _____ °C | 66 | 79 |
| 50% vol. @ _____ °C | 107 | 81 |
| 90% vol. @ _____ °C | 149 | 88 |
| F. B. P _____ | 172 | 155 |
| Total Sulphur _____ percent wt | 0.03 | 0.4 |
| Carbon Bisulphide | | 0.12 |
| Thiophene | | 0.08 |
| Aromatics _____ percent wt | 10.1 | 98.2 |
| Octane No. N. M. clear | 50.6 | |
| Octane No. N. M. +2 ml. TEL/IG | 66.0 | |
| Octane No. Research clear | 54.0 | |
| Octane No. Research +2 ml. TEL/IG | 67.7 | |

Table 2

| Motor Benzole percent vol.: | Blend A | Blend B |
|---|---|---|
| Gasoline Fraction | 85 | 70 |
| Coal Tar Benzole | 15 | 30 |

| Preparation | Before Autofining | After Autofining | Before Autofining | After Autofining |
|---|---|---|---|---|
| S. G. @ 60°F./60°F | 0.743 | 0.740 | 0.77 | 0.765 |
| Sulphur Total percent wt | 0.094 | <0.01 | 0.157 | <0.01 |
| Octane No. N. M. clear | 56.0 | 58.0 | 62.0 | 64.0 |
| Octane No. N. M. +2 ml. TEL/IG | 66.6 | 71.2 | 69.0 | 74.3 |
| Octane No. Research clear | 60.8 | 62.8 | 69.8 | 71.8 |
| Octane No. Research +2 ml. TEL/IG | 73.0 | 76.9 | 79.2 | 83.2 |

The blends were subjected to autofining under the following conditions:

Pressure _____ 100 p. s. i. ga.
Temperature _____ 780° F.
Space velocity _____ 1.0 v./v./hr.
Recycle rate _____ 4000 S. C. F./B.
Catalyst _____ Cobalt and molybdenum oxides on alumina.

The properties of the autofined blends are set out in Table 2.

In addition to an increased lead response and gains in clear octane number, the autofined blends are of improved stability, especially when leaded, and it is possible to dispense with the use of inhibitors.

EXAMPLE II

The feedstock consisted of a coal tar benzole having the following inspection data:

| | |
|---|---|
| Specific Gravity at 60° F./60° F. | .900 |
| Distillation (A. S. T. M.): | |
| I. B. P. | 77.5 |
| 2% recovered at °C | 79.5 |
| 5% recovered at °C | 80.0 |
| 10% recovered at °C | 81.0 |
| 20% recovered at °C | 82.5 |
| 30% recovered at °C | 84.0 |
| 40% recovered at °C | 85.5 |
| 50% recovered at °C | 88.0 |
| 60% recovered at °C | 91.0 |
| 70% recovered at °C | 100.5 |
| 80% recovered at °C | [1]168 |
| 90% recovered at °C | 212.5 |
| F. B. P. °C | 242 |
| Total sulphur percent wt | 1.59 |
| Mercaptan sulphur percent wt | Nil |
| Bromine number | 7.8 |
| Aromatics percent vol | 99.0 |

[1] The distillation ceased at 83.5% vol. and the temperature rose sharply before more distillate passed over; at this stage solid material formed in the condenser, melted and passed over.

This benzole was subjected to autofining under the conditions shown in Table 3 which also gives inspection data on the liquid product.

Table 3

| Hours on stream since regeneration | 1-5 | 6-10 |
|---|---|---|
| Operating Conditions: | | |
| Space Velocity v./v./hr | 0.5 | 0.5 |
| Average catalyst temperature °F | 780 | 780 |
| Pressure (equilibrium) p. s. i. ga | 30 | 30 |
| Catalyst | Cobalt and molybdenum oxides on alumina | |
| Liquid Product: | | |
| Specific Gravity 60° F./60° F | 0.892 | 0.893 |
| Sulphur content percent wt | 0.15 | 0.29 |
| Sulphur removal percent | 90.5 | 81.7 |

We claim:

1. A process for the catalytic desulphurisation of benzole which comprises passing the benzole in vapour form at a space velocity of 0.5–3.0 v./v./hr. and in admixture with hydrogen over a sulphur-resistant dehydrogenation-hydrogenation catalyst consisting of the oxides of cobalt and molybdenum supported on alumina at a selected temperature within the range 750–800° F. and a selected pressure within the range 100 p. s. i. ga. and equilibrium pressure, the selected temperature and pressure being correlated so that the dehydrogenation of naphthenes contained in the benzole is effected to an extent not substantially in excess of that required to produce sufficient hydrogen to convert the organically combined sulphur in the benzole into hydrogen sulphide and to maintain the vapour phase in the reaction zone, a hydrogen-rich gas being separated from the treated benzole and recycled to the reaction zone at the rate of 2000–10,000 S. C. F./B. to constitute the whole of the hydrogen supplied to said zone.

2. A process for the catalytic desulphurisation of motor fuel consisting of a mixture of benzole and straight run petroleum benzine, which comprises passing the fuel in vapour form at a space velocity of 0.5–3.0 v./v./hr. and in admixture with hydrogen over a sulphur-resistant dehydrogenation-hydrogenation catalyst consisting of the oxides of cobalt and molybdenum supported on alumina at a selected temperature within the range 750–800° F. and a selected pressure within the range 100 p. s. i. ga. and equilibrium pressure, the selected temperature and pressure being correlated so that the dehydrogenation of naphthenes contained in the fuel is effected to an extent not substantially in excess of that required to produce sufficient hydrogen to convert the organically combined sulphur in the fuel into hydrogen sulphide and to maintain the vapour phase in the reaction zone, a hydrogen-rich gas being separated from the treated fuel and recycled to the reaction zone at the rate of 2000–10,000 S. C. F./B. to constitute the whole of the hydrogen supplied to said zone.

References Cited in the file of this patent
UNITED STATES PATENTS

| | | |
|---|---|---|
| 2,253,308 | Rosen | Aug. 19, 1941 |
| 2,574,450 | Porter et al. | Nov. 6, 1951 |
| 2,606,141 | Meyer | Aug. 5, 1952 |
| 2,648,623 | Porter et al. | Aug. 11, 1953 |
| 2,656,302 | Porter et al. | Oct. 20, 1953 |